Aug. 25, 1936.  A. R. BLACK  2,052,020
SUBIRRIGATION SYSTEM
Filed Aug. 6, 1935
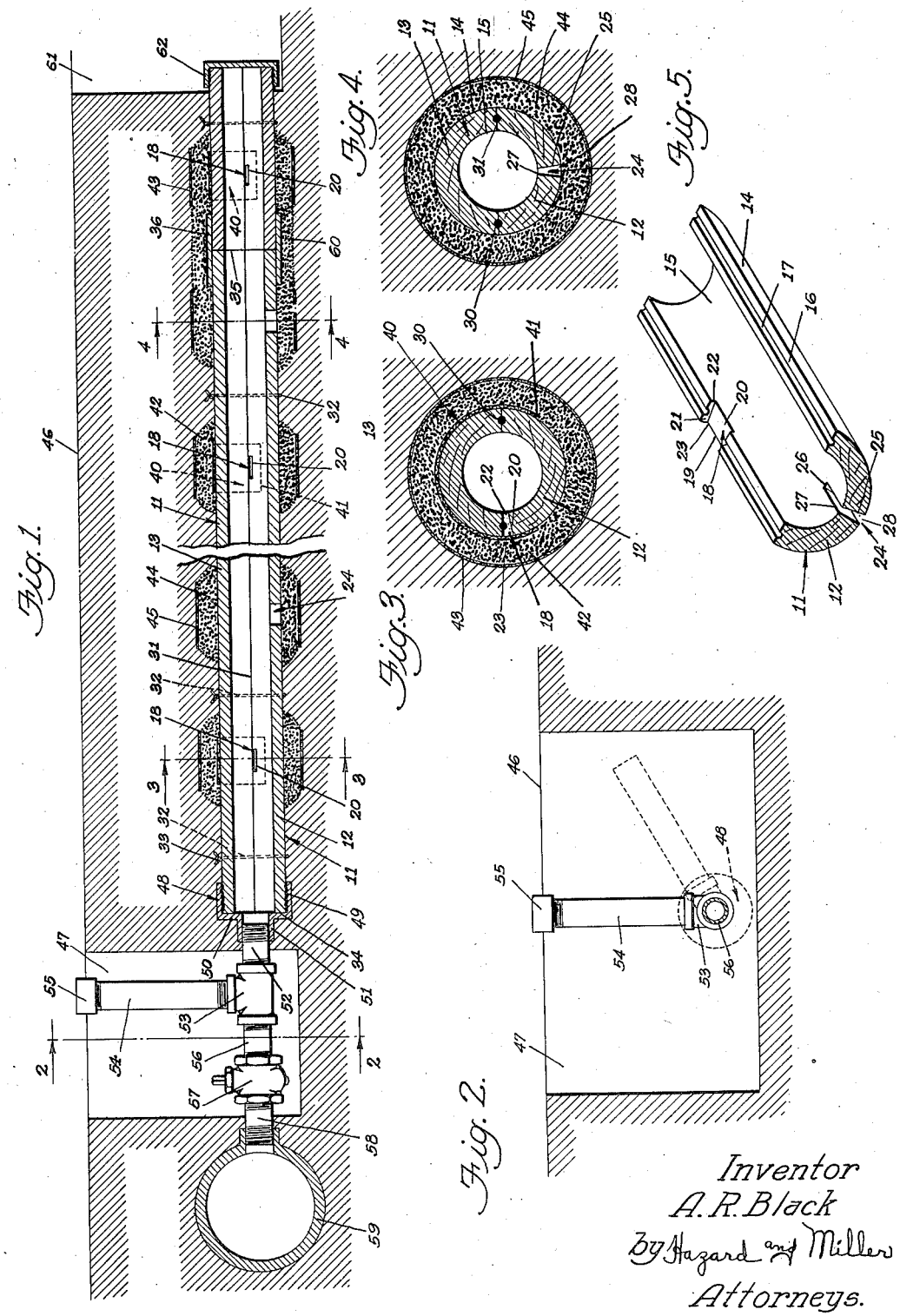
Inventor
A. R. Black
by Hazard and Miller
Attorneys.

Patented Aug. 25, 1936

2,052,020

UNITED STATES PATENT OFFICE 2,052,020

SUBIRRIGATION SYSTEM

Alexander Russell Black, Gardena, Calif.

Application August 6, 1935, Serial No. 34,914

12 Claims. (Cl. 61—13)

My invention relates to an apparatus and method for underground irrigation, including the supplying and spreading of water for irrigation underground and including a control of the water level sometimes designated water table, from the surface of the ground.

My invention also comprehends the use of the major portion of the same apparatus in the operation of draining the soil of surplus water and controlling the water level or water table in regard to the surface of the soil.

In the cultivation of many types of crops, especially those developed from seed, it is preferable to irrigate or supply the water from an underground source of supply and in the early stages of the formation of roots, it is necessary to have the soil moist practically to the surface in order to germinate the seeds and to form the initial root growth. As the plant increases in size it is desirable to lower the water table in the soil so that the roots will penetrate downwardly to secure their supply of water. Of course, in most soils, due to capillary action and their evaporation from the surface of the ground, the water rises in the soil from the underground supply, but with my invention for practical purposes the height to which the water will rise towards the surface may be controlled. Thus as the plant develops in size the upper limit of the main portion of the water supply may be lowered, thus developing deep rooting of the crop while maintaining the surface of the soil in a quite dry condition. This dry condition reduces evaporation from the surface of the ground and also reduces the growth of weeds.

By a reverse operation, should the soil become supersaturated by rains, floods or the like, or even by an excess of surface irrigation, the water in the soil may be drained and thus reduce the amount of water to develop the best growth of the plants. Moreover, this action of the sub-drainage causes a penetration of air from the surface and it is well known that the roots of plants require both air and moisture, as for most plants when the soil is supersaturated the air is excluded and there is not a proper root development.

Another feature of my invention as it applies to subsoil irrigation, is in carrying air into the subsoil, which air works its way to the surface and thus properly aerates the soil to secure a good development of the root.

Moreover, another feature of my invention is in employing a part of the irrigation apparatus and equipment between the periods of applying water to develop an air supply into the subsoil. This air supply is through the subirrigation pipes and the openings therein and is in part caused by the upward capillary flow of the water after discharge from the buried irrigation pipe, causing an upward flow of air discharged through openings in the pipe.

In my invention I employ irrigation pipe buried to the proper depth, such pipe being provided with openings for discharge of water and air. The control of the water level or water table in the soil is by means of a standpipe connected to each irrigation pipe, such standpipe being adjustable as to its upper end to regulate an overflow into a trench and thus control the upper reach of the irrigation water when the pipe is used to supply water underground and also controlling the drainage to the level to which the upper end of the standpipe is set; such standpipe being preferably swivelled on a connection to a buried irrigation pipe.

Another object and feature of my invention is the construction of an underground irrigation pipe system with openings for discharge of water and also for drainage of the pipe in which I use a form of automatically acting valve which allows outflow of water and also an inward flow in drainage, but this prevents sand and dirt from being carried into the irrigation pipe when such pipe is being used to drain the soil. For this purpose I preferably have horizontal discharge openings for the water with a valve in the form of a partial collar of fabric such as burlap, saturated with hot asphaltum and covered with a coating of sand, this being laid over the top of the irrigation pipe and downwardly over the horizontal discharge openings. In addition I preferably form a complete wrapping of fibrous material such as peat or bog moss secured in place with a wrapping of cheese cloth or the like, this being wound on the outside of the fabric valve of the collar.

Another object and feature of my invention is providing drain openings in the bottom of the irrigation pipe using a wrapping of the peat moss or similar material held in place by a band of cheese cloth. The operation in irrigating underground soil is to discharge water first from the portion of the pipe near the source of supply, the peat moss or similar material becoming saturated and then the water being carried on successively past the various openings to the remote end of the pipe system; the water being spread from the various wrappings of the moss or the like to a soil and working upwardly by capillary action.

In the supply of air to the subsoil I endeavor to have as much air as possible held in suspension in the irrigation water and also to have the standpipe open or uncapped so that a certain amount of air will be carried inwardly by the flow of the water past the standpipe. This brings air into the soil with the water. When the water is turned off or the supply discontinued the subirrigation pipe drains and becomes filled with air, the supply being through the standpipe. This air is then slowly discharged through the water discharge openings in the pipe.

In order to prevent roots entering the irrigation pipe through the water discharge openings, this is prevented in great part by draining the pipe as the roots will not seek to enter a pipe when there is no supply of water therein. Also in regard to the horizontal discharge openings, the loose valve of burlap prevents the roots entering these horizontal openings. In regard to the bottom openings, it is rare that the roots will turn upwardly into an opening. Moreover, the bandage of moss tends to prevent the entrance of roots.

In the drainage of soil of surplus water, the bandage of moss or equivalent material at each opening filters the water and causes a slow movement. The rate of flow may be controlled so that it is not sufficiently rapid to carry sand or other sediment upwardly through the bottom openings and the partial collar band over the horizontal openings requires the water to flow upwardly to these horizontal openings, thus reducing the amount of sediment which can be carried into the irrigation pipe. However, in my irrigation system I provide for flushing the irrigation pipe by having a trench at the discharge end. For supplying water for irrigation or for drainage the discharge end may be closed with a plug, but when it is desired to flush the irrigation pipe, the plug may be removed. For ordinary irrigation purposes I provide a slope of one inch to one hundred feet in the irrigation pipe from the supply source to its remote end.

Another feature of my invention relates to the type of and construction of the underground irrigation pipe, this being preferably made of wood of which I find redwood an excellent material on account of its resistance to either dry or wet rot. The pipe is preferably cylindrical on both its outside and inside surfaces and has a horizontal split from end to end of each pipe section. The abutting horizontal faces are provided with longitudinal grooves. In assembling the pipe, these grooves are filled with tar, pitch, asphaltum or the like and form a seal at the horizontal joint of the upper and lower pipe section, these sections being securely attached by bindings of wire or the like, spaced longitudinally of the pipe.

Another detail feature of my invention is in providing the horizontal outlet openings in the form of tapered water discharge ports, these being narrower on the inside of the pipe than on the outside so that any sediment passing the inside opening will have a free passage to the outside of the pipe. These openings are preferably made at the horizontal joint by having transverse notches cut at the joint between the upper and lower sections of the pipe. The drainage openings at the bottom of the pipe are preferably also formed tapered and may be elongated. The various pipe sections are connected by a metal sleeve fitting on the outside of the pipe at the ends and when successive pipes are laid the joint is wrapped with moss or the equivalent. The moss thus absorbs any water leaking at the joint and filtering any inflow at the end joint or coupling.

In installing my system of irrigation I preferably use underground supply pipes placed parallel to the sides of the field or area to be irrigated. Adjacent this pipe there is a trench parallel thereto or else a series of pits. A water conduit extends from the supply pipe across the pits or trench and has a valve and a standpipe for each stretch of irrigation pipe. These are buried by digging trenches transverse to the area to be irrigated, the trenches being spaced the distance apart of irrigation pipes, which pipes after being placed in the bottom of the trench are covered with soil and should be located below the lowest depth of cultivation. Thus the underground system has a series of parallel irrigation pipes, a longitudinal ditch or series of pits for the valves and the standpipes if desired. At the remote end of the irrigation system there may be a drainage trench or a series of pits.

My invention is illustrated in connection with the accompanying drawing, in which, Fig. 1 is a longitudinal section through a subirrigation pipe, showing also its connection to a supply main, a control valve and the adjustable standpipe.

Fig. 2 is a transverse section on the line 2—2 of Fig. 1 in the direction of the arrows.

Fig. 3 is a transverse section on the line 3—3 of Fig. 1 through the side ports.

Fig. 4 is a transverse section on the line 4—4 of Fig. 1 showing the bottom port.

Fig. 5 is a perspective view of a half section of the wood irrigation pipe.

In the drawing, the irrigation pipe designated by the numeral 11 is made in half sections, there being a lower section 12 and an upper section 13. The assembled pipe is preferably made cylindrical on its outside surface 14 and also cylindrical on its inside surface 15, these being concentric. Each of the sections has a marginal edge 16 with a longitudinal groove 17.

The horizontal ports 18 are formed by making transverse notches 19 in the lower half sections of the pipe at the edges 16. These are preferably constructed by having a flat surface 20 extending from the inside to the outside surface of the pipe and bounded by vertical end edges 21. These notches are narrower in a vertical measurement on the inside 22 than on the outside 23 so that they have an outward taper. Therefore any dirt, sand or sediment carried by the water in flowing outwardly through the port, if it passes the narrow inner end will have a free passage to the outside of the pipe.

The bottom discharge ports 24 are formed in the lower section 12 and preferably have flat surfaces 25 tapering outwardly and terminating at ends 26. These ports are narrower at their inner end 27 than their outer end 28.

The two halves of the wood pipe are assembled with the edges 16 in contact but prior to assembling these each of the grooves 17 is filled with a packing of tar indicated at 30, asphaltum or similar material. This when the two edges are brought into contact may spread on the edges but this is immaterial so long as it forms a water-tight horizontal joint, such joint being indicated by the numeral 31. The sections of the pipe are bound together by hoops or loops 32, each preferably being formed of a single wire, the ends being twisted as indicated at 33. The individual pipe sections are indicated as terminating at 34 and 35 and adjacent ends are connected by a sleeve or coupling 36 which is preferably a short metal tube having a tight fit on the exterior of the ends of the assembled wood pipe.

At each horizontal joint I employ a combination valve and collar 40, each of which is preferably made from a strip of burlap or similar material impregnated in hot asphaltum, by dipping the strip in the melted asphaltum and then both sides of the strip are coated with sand while the asphaltum is still moist, thus causing the sand to adhere to the burlap. This strip of burlap is placed over the top of the pipe assembly, the ends terminating as indicated at 41 slightly below the horizontal joint 31 and such strips are tied in place with a binding of string or the like. This string should be of such a character that it will readily rot or disintegrate when subjected to the moisture under ground.

A wrapping of absorbent fibrous material 42 is then used to encircle the pipe at each of the horizontal ports, forming a covering over the burlap strip and under the pipe. For this material I find peat moss such as the German peat moss an excellent material. This layer of absorbent fibrous material is held in place by a light wrapping 43 of thin fabric which is preferably cheese cloth, held in place by string or the like; or the overlapping ends of the cheese cloth may be loosely stitched, this merely being for the purpose of holding the peat moss or equivalent material in place on the assembled pipe.

On the portions of the pipe having the vertical port 24 in the bottom section I apply a wrapping 44 of peat moss or equivalent material around the outside of the assembled pipe and hold this in place by an outside wrapping of cheese cloth as indicated at 45 or equivalent material, either held in place by a light tying of string or by stitches.

In installing the irrigation pipe I preferably dig a number of parallel trenches spaced a desired distance apart to secure the proper irrigation, this depending on the types of crop to be raised and the depth the irrigation pipes are buried below the surface of the soil, such surface being indicated at 46. Along the ends of these trenches I form an end ditch 47 or else a series of pits. The supply end of each pipe is provided with a reducing coupling 48, this preferably having an outside sleeve section 49 internally threaded which may be screwed on to the outside of the pipe, the threads in the collar cutting into the wood of the pipe. An inturned shoulder 50 has a reduced collar 51 to which is connected a nipple 52. To this nipple I attach a T 53 and from each T there is a standpipe 54; each standpipe having a removable cap 55. A second nipple 56 connects to the T. A valve 57 connects to the nipple 56, a short pipe section 58 is attached to the other side of the valve and this connects to a supply main 59 buried the proper depth in the ground.

When the wood irrigation pipe is placed in the trench the ends of contiguous pipe sections are readily connected in the coupling 36 and a layer of peat moss or similar material 60 is wrapped around the coupling after the pipe is installed in the ditch to the desired length. The ditches are then filled, completely burying the irrigation pipe. If it is desired to drain these pipes towards their discharge end, I may form a drainage ditch or series of drainage pits 61 and provide a removable closure cap 62 at the end of each irrigation pipe, such cap preferably having a flange which is interiorly screw threaded and may be threaded on the end of the pipe forming its own thread on the wood. However, in many cases the pipe may terminate in the soil. I find it to advantage to have a slight slope from the feeding-in end to the remote end of about one inch to one hundred feet of pipe. For most irrigation the pipe may be quite small in internal diameter, but I find that three-quarters of an inch is usually sufficient to supply enough water. It will be understood that the pipe is buried at a sufficient depth so that neither the pipe nor the coverings of peat moss or other fibrous material are disturbed in the cultivation of the soil.

In the operation of my invention in irrigation, that is supplying the water, this is substantially as follows: Presuming a crop is to be raised from seed, water is supplied by the main 59, each standpipe 58 is in a vertical position and if it extends sufficiently above the ground level may have a cap 55 removed, thus exposing each standpipe at the top to air. However, if on account of the limitations of the ditches or pits 47 it is desirable to use a shorter standpipe, each may have a cap 55. The valves 57 are then opened, allowing water to flow from the main 59. It is desirable as far as possible to have the supply water well aerated so that the irrigation water carries as much air as possible. The water rises in the standpipe and as it comes to each of the horizontal ports 18 and the vertical ports 24, the water is discharged, the action being first to saturate the fibrous binding at each outlet. On account of the burlap covering being somewhat loosely fitted over the horizontal ports, water is readily discharged underneath the burlap, or although this burlap is substantially impervious, the water works its way downwardly and also to the marginal edges of the burlap. As each ring or layer of peat becomes saturated, the discharge of water is retarded and the flow continues until it reaches the end of the pipe. Then with all the bands of peat or similar material well saturated, there is a substantially equal distribution of water from each port. Presuming the soil is initially dry, the water rises towards the surface by capillary action and may be brought completely to the surface soil, maintaining this sufficiently moist for the germination of seeds. As the roots are formed and the crop begins to grow, in subsequent irrigations the standpipe 54 is tilted to one side or the other as indicated in Fig. 2, the T 53 readily rotating on the nipples 52 and 56. Then in applying the water for irrigation, when the standpipe is left open its elevation forms a hydraulic head and the water can be regulated by the valve 57 so that the flow is at such a rate that there is substantially no overflow from each standpipe.

As the water is applied quite slowly, there is sufficient time for it to rise to the surface by capillary action and thus bring the upper limit of the water table the desired distance below the surface of the soil. This causes the roots of the crop to penetrate downwardly and form deep rootings. In subsequent irrigations the standpipes are further tilted downwardly, thus lowering the open upper ends and increasing the distance from the surface of the soil to the upper limit of the moist earth. This method of irrigation maintains the surface soil quite dry, allowing penetration of air and reducing the evaporation from the surface as well as causing a deep rooting of the crop.

Between periods of irrigation, when the valves 57 are closed, the water drains through the ports until it reaches the level of the horizontal joint 31 and then drains through the bottom portion 24 so that the irrigation pipe is completely emptied. When so emptied there is no danger of roots entering the ports, on account of there being no moisture in the pipe to seek. During these intermediate periods the cap 55 is removed from the standpipe and if desired may be replaced by a cap having screen. Therefore air enters the standpipe and fills the wood irrigation pipes. As the moisture in the earth is carried upwardly by capillary action, air is discharged slowly through the various horizontal and vertical ports and slowly works its way towards the surface, thus aerating the soil from a sublevel and bringing the air into close contact with the root system of the plants.

In circumstances in which the irrigation of water carries sediment such as sand, which may be deposited in the wood irrigation pipes, this can be flushed out by a rapid flow of water through each pipe after removing the end plugs 62 and discharging into the cross ditches or pits 61. In some cases I make a reverse turn at the remote end of the strip to be irrigated and bring the return end of the pipe back to the ditch 47. These reverse turns may be made by using elbows or the like in place of the coupling 36. This develops substantially parallel sections of the irrigation pipe having one supply end and discharging in the ditches 47, the discharge end being slightly lower in elevation than the intake end and such discharge end normally may be closed with a closure cap.

In conditions in which the soil is supersaturated and it is desired to drain the soil leaving it substantially dry for a predetermined depth from the surface 46, the valves 57 are maintained closed and each standpipe 54 is tilted or inclined as shown in Fig. 2, the desired amount. The cap is removed from each standpipe and there is a reverse flow of water from the soil inwardly through the ports 18 and 24, which on account of the hydraulic head in the soil being greater than that at the standpipe causes a discharge from the open end of the standpipe. In the action of draining the soil the water must pass through the band of absorbent fibrous material such as peat moss, which functions to strain the water and also at the horizontal ports this water must work its way either upwardly from the lower ends 41 of the burlap strip or else from each edge. This effectively prevents sand and silt from being carried into the irrigation pipe. Also where the water flows upwardly in the vertical ports 24, on account of its slow rate of movement, it cannot carry sand or silt in suspension. Thus the water drained from the soil issues quite clear.

In cases in which the soil has become supersaturated to a material extent and it is desired to drain the soil rapidly, the standpipes may be tilted and also the closure plugs 62 may be removed, thus causing the major portion of the drained water to be discharged from the lowest end of the irrigation pipe and the water level in the soil regulated to a certain extent by the position of the upper end of each standpipe; such standpipe in this condition being open at the top.

In order the make a reverse turn at the end of the irrigation pipe and to have a parallel return, it is convenient to employ a reducing coupling such as 48 at the remote end of the first section of irrigation pipe from its inlet. The small end of the reduced coupling is connected to a pipe bent into a semi-circle, which by using another reducing coupling is connected to the second and parallel section of the irrigation pipe. It will be understood that where the irrigation pipe terminates in the ground that a closure plug or similar closure device is necessary at the remote end of the pipe.

A convenient manner and composition for forming the packing 30 in the grooves 17 consists of a mixture of asphaltum and boiled linseed oil in the proportions of seventy-five percent of asphaltum and twenty-five percent of oil. In preparing this the asphaltum is preferably heated to substantially its boiling point and the oil is then stirred into the hot mass of asphaltum to obtain a uniform mixture. This mixture is applied to the groove when it has acquired the proper consistency.

My system of irrigation can also be used in orchards or the like in which there is a permanent growth; the trenches being dug to a suitable depth preferably parallel to a row of trees and the irrigation pipes varied in the manner above described, the irrigation being carried out in the same manner. The depth to which the irrigation pipes are buried for fruit or similar trees of course, depends on the nature of the root system of such trees. If these have deep roots it is desirable to have the irrigation pipe quite deep in the earth, or for trees with a shallow root system the pipe may be buried to a lesser depth. With some types of trees the upper limit of the water saturation may be regulated in the manner above described, thus maintaining the surface soil substantially dry which may be worked into a mulch to reduce evaporation.

When it is desired between periods of irrigation, that is of applying water, to aerate the soil and in conditions in which the remote end of the irrigation pipe terminates in a drainage ditch or pit, it is desirable to remove the closure cap from the drainage end of the pipe and also the closure cap on the standpipe, which procedure allows air to enter at both ends of the pipe, such air gradually working its way upwardly through the soil. In the action of the water going towards the surface by capillary action, the air either becomes absorbed in the water and thus moves upwardly or follows the water as the soil dries or becomes partially dry.

With my system of irrigation when properly applied, as there is always in dry weather, evaporation from the surface of the soil or else together with the consumption of water by the growing crop I find that but little water is lost by a downward drainage, that most of this appears to move upwardly where it is available for the crops. However, in applying my irrigation system in orchards or the like for supplying water for the root system of trees, the irrigation may be regulated and the surface kept in a dry mulch condition so that there will be downward penetration of the water. With this procedure it is not necessary to bury the irrigation pipes adjacent the lowermost root system of the trees.

Various changes may be made in the details of construction without departing from the spirit or scope of the invention as defined by the appended claims.

I claim:

1. A sub-irrigation pipe formed of wood and having upper and lower half sections cylindrical on the outside and inside and with a horizontal joint formed by the marginal edges of the upper and lower sections, a sealing means at the said edges, hoops binding the sections together, ports formed by notches cut in the marginal edges of the lower section, the said ports expanding outwardly and having their upper surface defined by the lower edge of the upper section and their lower edge by a substantially radial plane, a covering valve formed of a fabric having an absorbed coating of asphaltum-like material with a covering of sand, the fabric being in the form of a strip extending over the upper section and slightly below the horizontal joint of the two sections.

2. A sub-irrigation pipe formed of wood and having upper and lower semi-circular sections, the pipe being cylindrical both outside and inside, the joint being horizontal and having marginal edges, each edge of the upper and lower sections having a longitudinal groove, grooves of contacting edges registering, a filling of asphaltum-like material in the grooves, hoops binding the sections together, the lower section having a series of ports formed by notches cut in the marginal edge of the lower section, the notches having a lower substantially plane surface, the upper surface of each port being defined by the lower edge of the upper section, the notches expanding outwardly.

3. A sub-irrigation pipe as claimed in claim 2, a cover valve formed of a strip of coarse fabric, said strip having a coating of absorbent asphaltum-like material, the surface covering of sand, the strip being placed over an upper section and a port, the lower ends of the strip overlapping the horizontal joint and the port, and a wrapping of absorbent fibrous material encircling the pipe over the fabric strip valve.

4. A sub-irrigation pipe as claimed in claim 2, the lower section of the pipe having secondary vertical ports in the bottom, and a wrapping of absorbent fibrous material around the pipe forming a covering for the secondary ports.

5. A sub-irrigation pipe as claimed in claim 2, a coupling connected to one end of the pipe, a supply pipe connected to the coupling and having a T, a standpipe connected to the T and open at the top, the standpipe and T being rotatable on the supply pipe to vary the elevation of the open end of the standpipe in reference to the irrigation pipe.

6. A sub-irrigation and drainage equipment, comprising in combination a sub-irrigation pipe having a series of ports located below a horizontal plane through the axis of the pipe, a covering on the outside of the pipe at the ports to restrict inflow of sand or silt from the soil, an open ended standpipe connected to one end of the irrigation pipe, and means to vary the elevation of the overflow from the standpipe to thereby control the depth of the water table in the soil below the ground surface, certain of the ports having a cover valve formed of a strip of fabric impregnated with asphaltum-like material and having a coating of sand, the strip being placed over the top of the irrigation pipe with the lower edges extending below the horizontal plane through the axis of the irrigation pipe.

7. A sub-irrigation and drainage equipment, comprising in combination a sub-irrigation pipe having a first series of ports, said ports being located slightly below the horizontal axis through the pipe and a second series of ports in the bottom of the pipe, a cover valve over each of the first ports, consisting of a strip of fabric impregnated with asphaltum-like material and having a coating of sand, the lower ends of the strips extending slightly below the first ports, a wrapping of fibrous absorbent material encircling the pipe at each of the ports, a supply pipe connected to one end of the irrigation pipe, an open ended standpipe connected to the supply pipe, means to turn the standpipe on the supply pipe to vary the elevation of the open end of the standpipe in reference to the irrigation pipe.

8. A sub-irrigation and drainage equipment comprising in combination a wood sub-irrigation pipe cylindrical inside and outside and formed of upper and lower sections with a horizontal joint formed by marginal edges, a sealing means at the joint, means to attach the sections together, a first series of ports formed by notches in the marginal edge of the lower section, a cover valve formed of a strip of fabric having an absorbent coating of asphaltum-like material with a surface coating of sand, the strip being placed over the pipe at the first ports, the lower edge of the strip extending below said ports and a wrapping of fibrous absorbent material over the cover valve, a second set of vertical ports in the bottom of the lower section, a wrapping of fibrous absorbent material surrounding the pipe at the second ports, a supply pipe connected to one end of the irrigation pipe, a standpipe swivelly connected to the supply pipe, said standpipe having a removable closure cap.

9. A sub-irrigation pipe having a port-like opening in its side located below a horizontal plane through the axis of the pipe, a valve covering formed of fabric having an absorbent coating of asphaltum-like material with a covering of sand, the fabric being in the form of a strip extending over the top of the pipe and slightly below the said opening.

10. A sub-irrigation pipe having a port-like opening located below a horizontal plane through the pipe, a valve covering formed of a strip of coarse fabric, said strip having a coating of asphaltum-like material, the strip being placed over the top of the pipe, the lower ends of the strip overlapping the port, and a wrapping of absorbent fibrous material encircling the pipe over the fabric strip valve and also underneath the pipe.

11. A sub-irrigation pipe having a port-like opening located substantially adjacent the bottom of the pipe, a wrapping of absorbent fibrous material encircling the pipe and covering the said port, and a fabric binding for the absorbent fibrous material.

12. A sub-irrigation pipe formed of wood and having ports spaced longitudinally thereof for the flow of water, a coupling connected to one end of the pipe, a supply pipe connected to the coupling and having a T, a standpipe connected to the T and open at the top, the standpipe and T being rotatable on the supply pipe to vary the elevation of the open end of the standpipe in reference to the irrigation pipe.

ALEXANDER RUSSELL BLACK.